United States Patent [19]

Bricknell et al.

[11] 4,030,776

[45] June 21, 1977

[54] FAIRLEAD AND IMPLEMENT HITCH AND METHOD OF IMPLEMENT RETRIEVAL

[75] Inventors: William H. Bricknell, St. Thomas; Gerald N. Sunderlage, London, both of Canada

[73] Assignee: Clark Equipment Company, Buchanan, Mich.

[22] Filed: Mar. 19, 1976

[21] Appl. No.: 668,774

[52] U.S. Cl. .......................... 280/477; 280/491 F
[51] Int. Cl.² ........................................ B60D 1/18
[58] Field of Search ........... 280/491 F, 477, 478 R, 280/480; 254/166

[56] References Cited

UNITED STATES PATENTS

| | | | |
|---|---|---|---|
| 785,057 | 3/1905 | Stevenson | 280/480 |
| 1,924,235 | 8/1933 | Fontaine | 280/477 |
| 2,129,745 | 9/1938 | Scammell | 280/477 X |
| 3,319,936 | 5/1967 | Askins | 254/166 |

*Primary Examiner*—Joseph F. Peters, Jr.
*Assistant Examiner*—R. Schrecengost
*Attorney, Agent, or Firm*—Harry G. Thibault

[57] ABSTRACT

A fairlead and implement hitch for off-highway vehicles, particularly log skidders used in site preparation work, in which the implement is normally hitched to the vehicle, but remains attached to the cable such that when the vehicle looses traction in soft ground, the implement may be unhitched by paying out the fairlead cable leaving it behind until the vehicle regains firm ground and thereafter winching in the implement which is again hitched to the vehicle in a manner to relieve the cable of any towing forces.

7 Claims, 5 Drawing Figures

FAIRLEAD AND IMPLEMENT HITCH AND METHOD OF IMPLEMENT RETRIEVAL

BACKGROUND OF THE INVENTION

In many towing applications, the towed vehicle is an implement which must be dropped or unhitched when the towing vehicle or tractor becomes stuck to allow the tractor to extricate itself and then, using a rope or cable, pull the implement out and onto firm ground.

This type of situation occurs in site preparation work in connection with tree harvesting operations. For example, a log skidder will often be used to pull a chopper, a large drum having a series of knives projecting from the surface, which cuts up into a more biodegradable size the residue left from harvesting the trees thus preparing the ground for new forest growth. As often occurs with a skidder towing its chopper, the combined unit will become mired requiring that the skidder be unhitched so that it can be driven out and onto firm ground.

The skidder will usually have a fairlead boom which includes a power driven cable system that can be paid out to retrieve the implement. Thus, for a skidder which has as standard equipment a fairlead boom and power winch, this type retrieval is commonplace.

DESCRIPTION OF THE PRIOR ART

It has been proposed that a separate set of fairlead rollers be mounted on the rear of the skidder frame directly behind the winch. The fairlead cable will be passed through this set of rollers and attached to the implement. This arrangement permits the operator to pay out the cable as soon as the skidder commences to lose traction and to winch it in after the skidder regains firm ground but the cable is kept under constant tension from the towing forces.

Also, during retrieval the implement is pulled up snug against the fairlead rollers at the rear of the vehicle and it is impossible to eliminate impact with the drawbar against the rollers. The implement also lunges forward at times during towing causing the drawbar to hit with considerable force against the rollers often knocking them out of alignment.

The implement yoke on the drawbar which abuts against the fairlead rollers also tends to become cocked when winching in the implement such that it was likely to engage under the rear frame of the skidder or turn with only one end making contact with the rollers resulting in distortions and stresses because of unequal loadings.

DESCRIPTION OF THE INVENTION

These and other problems were observed by persons skilled in the art, but no solutions have been forthcoming heretofore until the advent of the present invention which is described in the following manner.

SUMMARY OF THE INVENTION

A fairlead and implement hitch for off-highway vehicles is provided where the fairlead includes a horizontal roller mounted on the vehicle frame at the rear. A fairlead cable is paid out over the roller from a power winch. A hitch on the frame in the form of a recess or slot is generally in line with a vertical plane tangent to the roller for receiving a yoke pivotally mounted on the drawbar of the implement. When towing the implement, the fairlead cable remains attached to the yoke, but the ends of the yoke are pulled up into the hitch slot, one on each side of the frame. By this arrangement the towing forces are transmitted directly to the frame.

Mindful of the fact that the yoke is pivotally mounted on the drawbar and may become cocked relative to the rear of the towing vehicle, the fairlead cable is attached to a harness separated into two strands. One strand is attached on each end of the yoke. This forms a triangular cable towing harness which has the effect, when passing over the horizontal roller under tension, of equalizing the pull at opposite ends of the yoke preventing it from skewing.

It is further contemplated that a method of releasing and retrieving an implement be provided wherein the implement may be unhitched without need of the operator leaving the cab by merely slackening the cable and allowing the force of gravity to drop the yoke out of the hitch slot. The winch is then allowed to free wheel so that the cable is paid out through the fairlead rollers, one vertical roller on each side of the horizontal roller, providing antifriction surfaces for the cable to run against.

In retrieving the implement the yoke is brought up to the rear of the towing vehicle where abutment surfaces are provided, one on each side of the frame, against which the ends of the yoke will strike. The abutment surfaces are so positioned that the fairlead rollers will not be struck. The hitch slots will have diverging openings which converge with the abutment surfaces such that by slackening the cable, the yoke is dropped by gravity below the apex of the diverging, converging surfaces and may then be pulled up into the hitching position simply by taking the slack out of the cable. Accordingly, the towing or impact forces are not transmitted to the cable or to other components such as the fairlead rollers.

It is also possible that the implement yoke will be mounted on a vertically pivotal section of the drawbar and in the event, to avoid a double pivotal coupling which would enable the drawbar to break down and under the vehicle frame when the towing forces were unequal or in backing, the ends of the yoke are provided with a key structure rigidly secured thereto which mates with the diverging openings of the hitch slots on the vehicle frame to lock out any pivotal motion of the yoke when hitched to the vehicle.

These and other advantages will be more apparent by referring to the following detailed description of the drawings which proceeds as follows:

DETAILED DESCRIPTION OF THE DRAWINGS

DESCRIPTION OF THE PREFERRED EMBODIMENT

Figure 1:
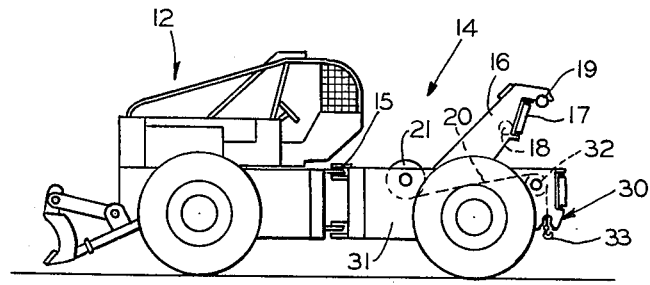
FIG. 1 is a side elevational view of a tractor vehicle, and more particularly an articulated skidder, having a fairlead boom on the rear section for winching logs and a second fairlead and hitch arrangement mounted on the rear frame section for towing an implement such as a chopper for use in site preparation work.

In FIG. 1 a tractor vehicle, and more particularly a special purpose tractor vehicle commonly referred to as a skidder, has a front section 12 and a rear section 14 articulated about a hinge 15. This four-wheel drive, center pivot machine is normally used for skidding logs. For this purpose it will have a fairlead boom 16 which carries vertical fairlead rollers 17, one on each side, and horizontal rollers 18 below and 19 above which together guide the fairlead cable 20 when being used to retrive logs. A power winch 21 pulls the logs out of the woods and lifts the ends up under the fairlead boom 16. The logs may then be skidded to a landing or the like.

Another use for skidders is in site preparation work where the skidder will be used more like a conventional tractor in that it pulls an implement such as a chopper (FIG. 4) the function of which is to reduce to small size the refuse from a tree harvesting operation and thereby facilitate restoring the area to its natural state to support new growth. To this end the skidder is provided with a second fairlead in combination with a fairlead in combination with a hitch at the rear of the vehicle generally indicated by the numeral 30 in FIG. 1. In this application the fairlead cable 20 is fed rearwardly from the winch 21 between the rear frame sections 31 over a horizontal roller 32. Vertical rollers 49 are provided on the rear frame sections 31 rearward of the roller 32. A hook 33 on the trailing end of the cable is attached to a towing cable harness 35 having separate strands 36, 37 (FIG. 3) which attach to ears 48 at spaced locations on a yoke 38 of the implement drawbar 45.

Figure 2:
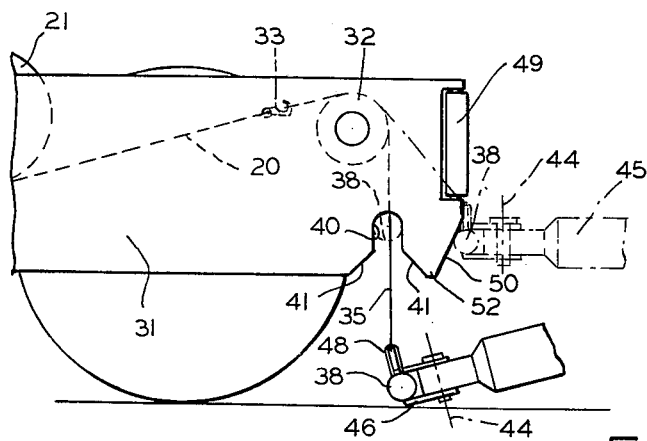
FIG. 2 is a partial rear view of the rear section of the vehicle frame showing the relationship of the fairlead and hitch to the implement yoke and drawbar in first the abutting dot-dash line position, then lowered retrieved position shown in full lines and last the hitched position shown by the dotted end only of the yoke in the hitch slot.

The axis of the horizontal roller 32 is positioned generally above and forward of the hitch which is formed by a pair of slots 40, one on each side of the frame 31, the slots being aligned with a vertical plane tangent with the roller 32 (FIG. 2). The openings 41 of the slots 40 diverge toward the bottom for reasons described more in detail hereinafter.

The yoke 38 of the implement drawbar is pivotally mounted at 44 to the drawbar 45 on a swivel block 46. The ears 48 in which the ends of the cable harness 35 are hooked, are more or less equidistant from the pivot axis 44 of the swivel block 46 such that the yoke 38, when pulled by the harness 35, will be maintained in a generally transverse attitude with respect to the rear of the skidder. The yoke 38 will be pulled by the cable harness to the position shown in dot-dash lines in FIG. 2 where the ends of the yoke abut against surfaces 50 at the rear of the side frames 31. It will be noted that the abutment surface 50 on each of the side frames 31 converge toward the bottom with the openings of slots 40 to form an apex or narrow portion 52 by slackening the cable 20 as depicted by solid lines in FIG. 2. By then pulling up on the cable, guided by the harness and roller 35, 36, 37, the ends of the yoke are lodged in the slots 40 as depicted by the dotted ends of the yoke in FIG. 2. Thus, all the towing forces are taken by the slots 40 and the cable 20 is only required to hold the weight of the yoke and drawbar 45.

Figure 5:
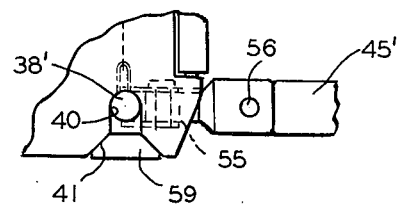
FIG. 5 is a fragmentary view showing a modification where a key structure on each end of the yoke engages the diverging openings of the hitch slots to lock out pivotal motion of the yoke.

Referring to FIG. 5 it will be appreciated that there may be times when the drawbar will have a vertically pivoted front section 55 mounted to the main drawbar 45' on a horizontal pivot 56. In this arrangement, the yoke 38' will need to be locked out from pivoting in the hitch slots 40 and to this end, a key 59, one on each end of the yoke, is pulled up into and makes engagement with the diverging openings 41 of the slots so as to prevent rotation. Thus a buckling of the drawbar at pivot 56 is prevented in the event the skidder is backed up or the towing forces become unequal otherwise allowing the implement to lunge forward.

Figure 3:
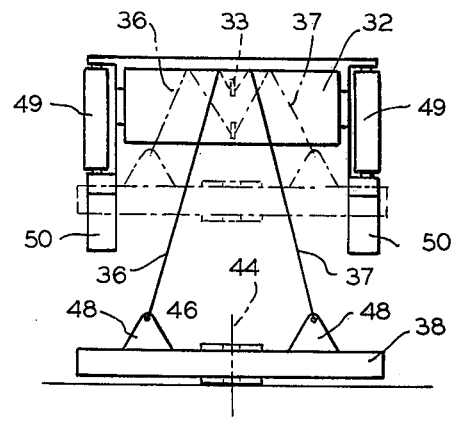
FIG. 3 is a partial rear view showing the frame mounting of the fairlead rollers and the triangular cable towing harness attached to the yoke in the lowered retrival position, shown in full lines, and in the hitched position, shown in dot-dash lines.
Figure 4:
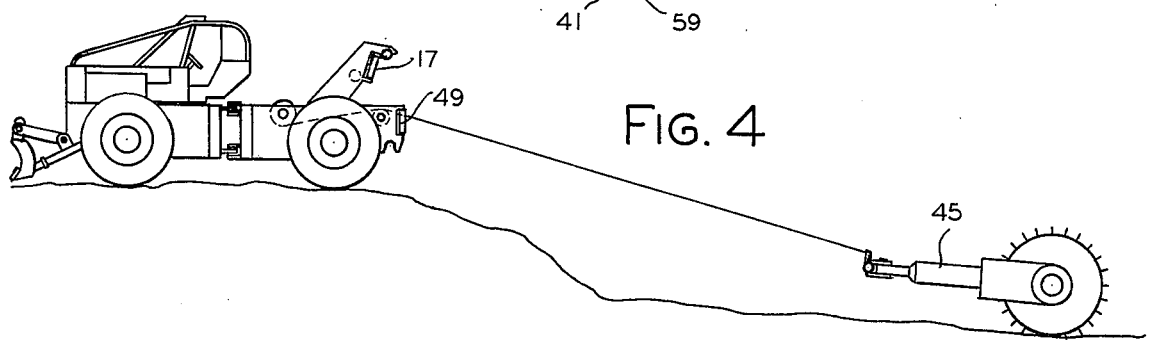
FIG. 4 is a view depicting the retrieval of the implement.

Referring to FIG. 4 in conjunction with FIGS. 2 and 3 and the foregoing, it will be appreciated that a novel method of hitching and unhitching an implement is provided where the operator remains in the cab throughout the operation. Referring to FIG. 4, and in conjunction with FIG. 2, the operator will, when the skidder encounters soft ground, drop the yoke 38 by slackening the cable 20 and drive off leaving the implement behind as depicted in FIG. 4. Thereafter when the skidder has regained firm ground the winch 21 will pull in the cable 20 such that the yoke 38 is brought up into abutting relationship with the abutment surfaces 50 on the rear of the machine. Thereafter the operator slackens the cable allowing the yoke 38 to drop as depicted in FIG. 2 and subsequently pulls the cable 20 again to lift the ends of the yoke into the slots 40. The implement will then be rehitched for towing.

While one preferred embodiment of my invention has been disclosed it will be understood that the description is for the purposes of illustration only and that various modifications and changes may be made without departing from the nature of the invention which is defined in the appended claims.

We claim:

1. In a vehicle adapted for towing an implement having a drawbar, said vehicle having a pair of side frames, the combination comprising a power winch, a length of cable wound upon the winch which is adapted to be paid out from the rear of the vehicle and retracted by the winch, a horizontal roller supported between the side frames and mounted behind the winch which provides an anti-friction surface for paying out and retracting the cable, and a hitch on the rear of the vehicle frame situated with respect to said cable to cause the implement drawbar, when pulled by the winch, to be brought into abutting engagement with the vehicle, said hitch including an opening in the vehicle frame, said opening comprising a pair of vertically extending slots, one in each of the side frames, the slots being provided in a vertical plane tangent to the surface of said roller and being accessible from the bottom and adapted to receive portions of the implement drawbar in hitching relationship.

2. The combination according to claim 1 wherein each of the vertically extending slots has a diverging lower end capable of receiving opposite end portions of the implement drawbar.

3. The combination according to claim 2 wherein the drawbar includes a yoke pivoted at the front having tranversely projecting ends, and a cable harness having separate strands, one attached to each end of the yoke forms a triangular cable hookup with said winch cable and when traveling over said roller tends to maintain said yoke transverse to the rear of the vehicle.

4. The combination according to claim 3 wherein there is an abutment surface at the rear of the vehicle frame engageable with the yoke.

5. The combination according to claim 4 wherein there are a pair of vertically disposed rollers one mounted on each side of the frame and above said abutment surface.

6. The combination according to claim 5 wherein the drawbar has a vertically pivoted front section to which the yoke is mounted, said yoke having a pair of key structures, one on each end to be received in the diverging opening of said slots and thereby lock out any pivotal motion of the yoke.

7. The method of hitching and unhitching an implement where there is a power winch and cable on the rear of the towing vehicle, a hitch at the rear with a pair of open slots accessible from below, one on each side of the vehicle frame, a roller rotatable on a horizontal axis, the slots being in a vertical plane tangent to the roller, and the implement having a drawbar with a yoke at the front to which the cable is attached, the yoke being pivoted in the center and having opposite ends adapted to be received in the slots and the cable having separate strands attached equidistant on each side of the center and the vehicle frame having an abutment surface at the rear, wherein the steps comprise pulling the cable so that the separate strands are drawn across the roller tending to equalize the forces at opposite ends of the yoke, contacting the yoke on said abutment surface, slackening the cables to lower the yoke below the slots and retracting the cable sufficient to raise the yoke vertically so that the ends thereof are received in the slots whereby towing forces are absorbed by the vehicle frame.

* * * * *